March 15, 1932.    E. A. WALKER    1,849,894

THREAD CUTTING TAP

Filed Jan. 22, 1931

Inventor
Ernest A. Walker
By attorneys

Patented Mar. 15, 1932

1,849,894

UNITED STATES PATENT OFFICE

ERNEST A. WALKER, OF WORCESTER, MASSACHUSETTS, ASSIGNOR TO JOHN BATH, OF WORCESTER, MASSACHUSETTS

THREAD CUTTING TAP

Application filed January 22, 1931. Serial No. 510,516.

This invention relates to a tap designed for cutting a special thread in a nut or other internally threaded device. In certain devices, such as a particular type of lock nut, it is desirable to provide the inner end faces of the internal threads in the nut or device with a surface shaped somewhat differently from that which can be produced by boring or reaming a straight hole in the device. In one such lock nut, the inner surface of the threads in the nut is of a spiral conical form, producing a wedging action when moved relatively axially with reference to a bolt by engagement with a member to be secured.

It is the object of my invention to provide a tap having cutting edges so designed as to produce a surface of a desired and special contour at the inner ends of the nut threads.

A further object of my invention is to provide a tap in which alternate teeth of the tap shape the nut threads at the sides, while intervening teeth of the tap clear the threads at the sides but shape the inner end surfaces of the threads.

My invention further relates to arrangements and combinations of parts which will be hereinafter described and more particularly pointed out in the appended claims.

A preferred form of the invention is shown in the drawings, in which

Figure 4:
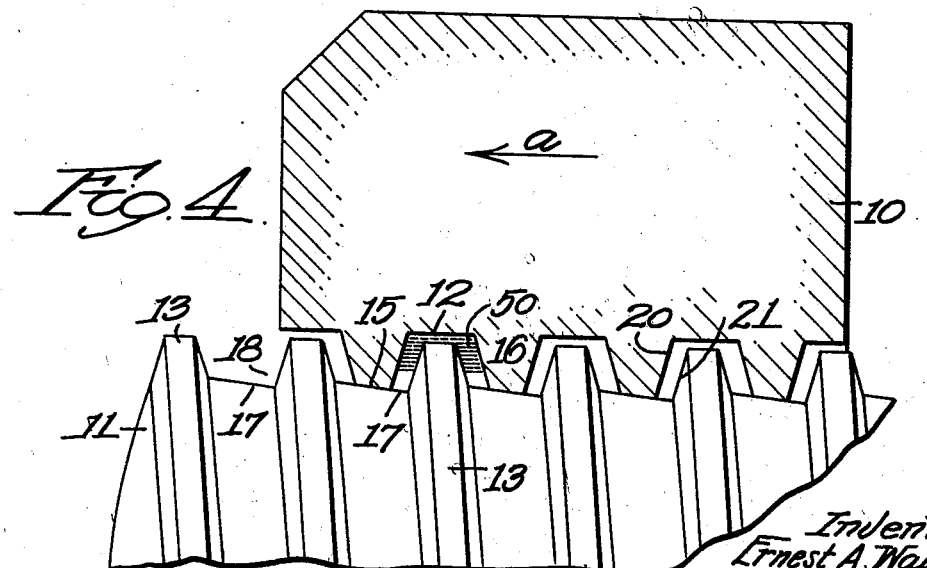
Fig. 4 is a sectional view showing a bolt in operative relation with a nut threaded by my improved tap.

Referring first to Fig. 4, I have shown therein a nut 10 and bolt 11 of a commercial form, in which the thread grooves 12 of the nut 10 are of such size as to provide substantial clearance at the sides and bottom of the groove 12, with respect to the thread 13 of the bolt 11.

The inner surfaces 15 of the threads 16 on the nut 10 are cut at an angle to the axis of the nut and bolt, instead of being parallel thereto as in the usual Acme thread, and the surfaces 17 at the bottom of the grooves 18 between the threads 13 of the bolt 11 are similarly inclined with respect to the axis of the bolt. The side clearance of the grooves in the nut with respect to the threads of the bolt allows limited axial movement or adjustment of the nut relative to the bolt.

If the nut is positioned so that the leading side surface 20 of the nut thread is adjacent to the side surface 21 of the bolt thread, the inclined surfaces 15 and 17 will be radially separated and the nut will turn freely on the bolt. When the nut engages a surface to be clamped, however, the nut will be forced axially along the bolt in the direction of the arrow $a$, thus causing the tapered inclined surfaces 15 and 17 to come into engagement with each other and to firmly lock the nut on the bolt.

No particular difficulty is encountered in providing a bolt with the inclined or conical surfaces 17 between the threads 13, but substantial difficulty has been encountered in producing a nut with the inclined conical surfaces 15 at the inner ends of the threads 16.

Figure 1:
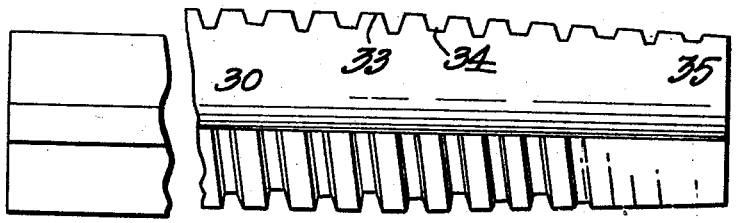
Fig. 1 is a side elevation of a tap embodying my improvements.
Figure 2:
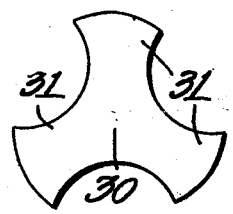
Fig. 2 is an end view thereof.
Figure 3:
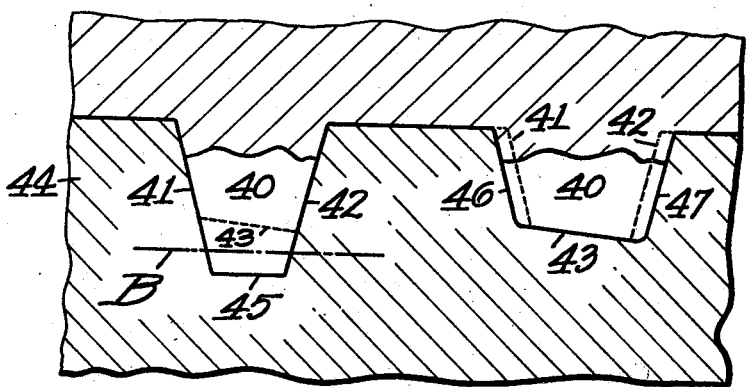
Fig. 3 is an enlarged detail sectional view of portions of the nut and tap.

In the working out of my invention, I have produced the tap shown in Figs. 1 to 3, which is effective for tapping a nut of the construction shown in Fig. 4.

In the drawings, I have shown a tap having a body 30 grooved longitudinally to provide lands 31 (Fig. 2) and I preferably but not necessarily provide an uneven number of lands. Teeth 33 separated by grooves 34 are formed in the lands 31 by any usual cutting or grinding operation and the entering end of the tap is tapered as usual and as indicated at 35.

In the preferred procedure of manufacture, I first form the tap by cutting a groove 40 therein to produce the surfaces 41 and 42 at the sides of the thread 44 and the surface 43 at the bottom or root of the groove 40. I then submit the tap to a grinding or relieving operation by which one groove 40 will be increased in depth to the line indicated at 45 in Fig. 3, and the next groove 40 will be cut away at the sides to the lines indicated at 46 and 47 in Fig. 3. The lengthwise grooves between the lands are deep enough to extend well below bottom surfaces 43 and 45 of the thread grooves.

The thread grooves are relieved alternately along the thread spiral as above described. As the number of lands is uneven, this produces alternate deep grooves and wide grooves lengthwise of the lands 31, as well as spirally along the threads.

In the use of my improved tap, the nut is first bored to an internal diameter indicated at B in Fig. 3, the surface B being of less diameter than the inclined cutting surface 43. As the tap advances in the nut, the threads 44 of the tap cut a thread groove 12 (Fig. 4) therein and leave threads 16 between the grooves, the threads then having a cross section like the space between the side faces 41 and 42 of the tap and the inner surface B of the nut.

This inner surface B is then reamed or trimmed by the inclined cutting surface 43 at the bottom of the thread groove on the next following land of the tap. The sides of the threads of the tap at each side of the surface 43 are cut away at 46 and 47, so that the cutting edge 43 extends across and beyond the inner surface of the partially formed thread 16 in the nut, thus providing a clear cutting edge for the full width of the thread.

It will be understood that the formation of the thread in the nut takes place in the usual manner by removing successive portions or layers 50 (Fig. 3) from the bottom of the groove in the nut, until the desired depth of thread groove is attained, this being due to the tapered portion 35 of the tap. The bottom cutting edges 43 are also arranged at a slight taper so that successive thin chips are removed from the inner end faces of the threads.

Thus by a single tapping operation, I provide a nut having a desired thread section and also having the inner faces of the threads cut in the form of a conical spiral for engagement with a similar surface on the special bolt 11 previously described.

The provision of side clearance, as indicated at 46 and 47, and bottom clearance as indicated at 45, is very important, as otherwise the tap would be subject to much greater strains, and the corners of the threads in the nut would be rounded, instead of presenting the full width conical surface shown in the drawings.

Having thus described my invention and the advantages thereof, I do not wish to be limited to the details herein disclosed, otherwise than as set forth in the claims, but what I claim is:—

1. A tap comprising a body deeply grooved longitudinally to provide a plurality of lands, and cutting teeth and intervening thread grooves formed in a helical series on said lands, alternate thread grooves in said helical series being of the width of the internal threads to be formed but of greater depth than said threads, and intervening thread grooves of the tap being of less depth and each having a bottom face inclined with respect to the axis of the tap and adapted to trim the inner end faces of the internal threads cut by said tap to an interrupted helical conical surface.

2. A tap comprising a body deeply grooved longitudinally to provide a plurality of lands, and cutting teeth and intervening thread grooves formed in helical series on said lands, alternate thread grooves in said helical series being of the width of the internal threads to be formed but of greater depth than said threads, and intervening thread grooves of the tap being of greater width than the first-named grooves but of less depth and each having a bottom face inclined with respect to the axis of the tap and adapted to trim the inner end faces of the internal threads cut by said tap to an interrupted helical conical surface.

3. A tap comprising a body deeply grooved longitudinally to provide a plurality of lands, and cutting teeth and intervening thread grooves formed in a helical series on said lands, two kinds of thread grooves alternating in said helical series, with one kind of groove of a certain width and depth and having cutting faces at the sides only thereof, and with the second kind of groove of greater width and less depth and having a cutting edge at the bottom only thereof.

4. A tap comprising a body deeply grooved longitudinally to provide a plurality of lands, and cutting teeth and intervening thread grooves formed in a helical series on said lands, two kinds of thread grooves alternating in said helical series, with one kind of groove of a certain width and depth and having cutting faces at the sides only thereof, and with the second kind of groove of greater width and less depth and having a bottom face provided with a cutting edge at the bottom only of the thread groove and inclined with respect to the axis of the tap.

In testimony whereof I have hereunto affixed my signature.

ERNEST A. WALKER.